Figure 2:
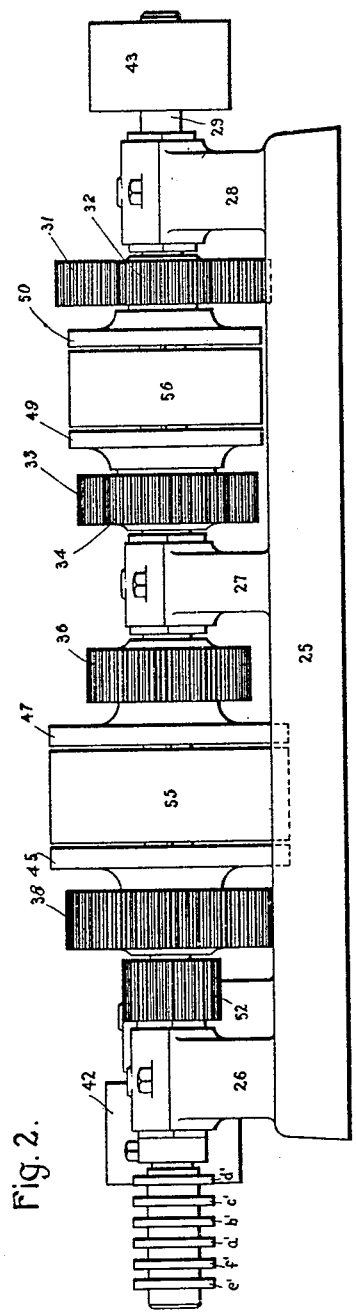

No. 865,997. PATENTED SEPT. 17, 1907.
A. CHURCHWARD.
ELECTROMAGNETIC VARIABLE SPEED MECHANISM.
APPLICATION FILED DEC. 20, 1902.
2 SHEETS—SHEET 1.
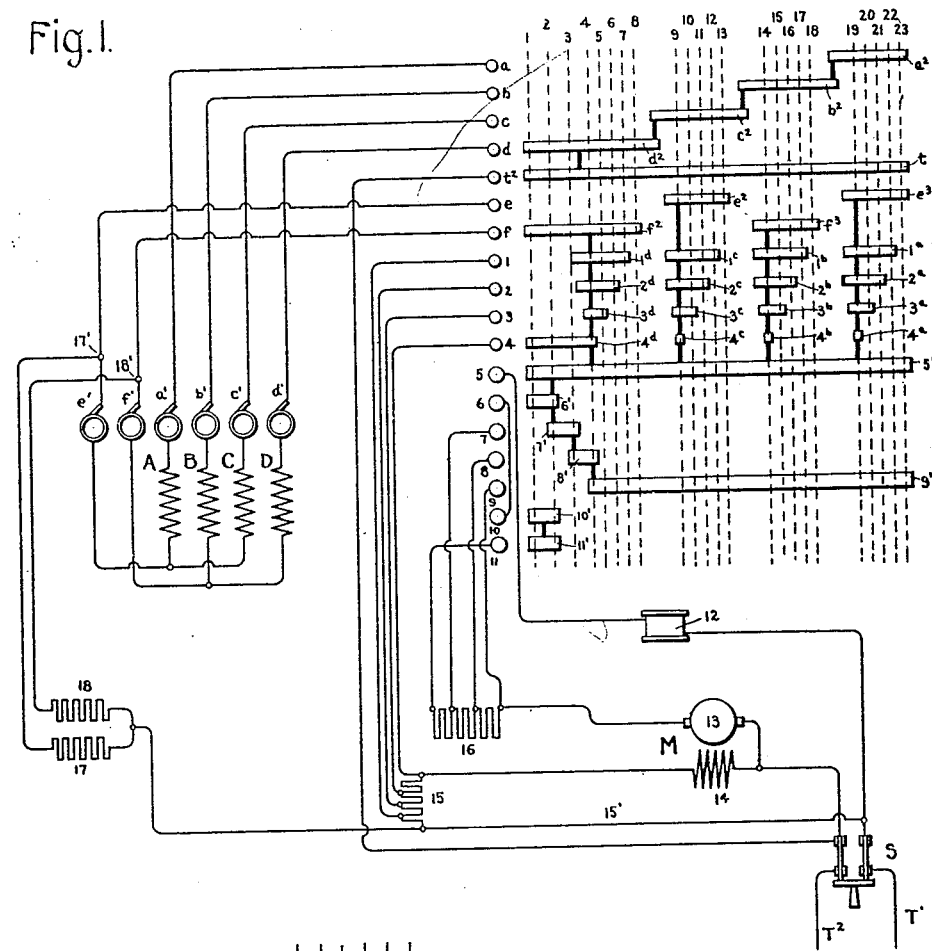
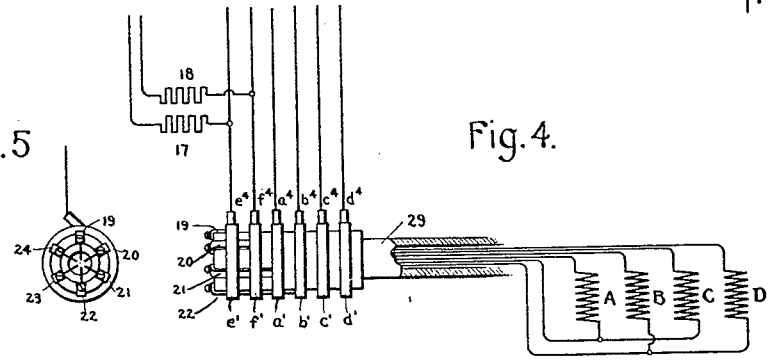
WITNESSES.
J. Ellis Glenn
Helen Orford
INVENTOR
Alexander Churchward.
by Albert G. Davis
Atty.

No. 865,997. PATENTED SEPT. 17, 1907.
A. CHURCHWARD.
ELECTROMAGNETIC VARIABLE SPEED MECHANISM.
APPLICATION FILED DEC. 20, 1902.

2 SHEETS—SHEET 2.

WITNESSES.
J. Ellis Glenn.
Helen Orford

INVENTOR
Alexander Churchward.
by Albert G. Davis
Atty.

UNITED STATES PATENT OFFICE.

ALEXANDER CHURCHWARD, OF NEW YORK, N. Y., ASSIGNOR TO GENERAL ELECTRIC COMPANY, A CORPORATION OF NEW YORK.

ELECTROMAGNETIC VARIABLE-SPEED MECHANISM.

No. 865,997.   Specification of Letters Patent.   Patented Sept. 17, 1907.

Application filed December 20, 1902. Serial No. 135,950.

*To all whom it may concern:*

Be it known that I, ALEXANDER CHURCHWARD, a citizen of the United States, residing at New York, county of New York, State of New York, have invented certain new and useful Improvements in Electromagnetic Variable-Speed Mechanisms, of which the following is a specification.

My invention relates to improvements in power transmission mechanism and especially to that class of variable-speed transmitting devices which utilize a plurality of electro-magnetically-actuated clutches for obtaining a wide range of speed variation from a source of power running at substantially a constant rate of speed or at a speed variable between narrow limits.

It is especially applicable to the driving of printing-presses, machine tools, motor vehicles, and the like, which require a great range of speed variation.

Heretofore it has been proposed to construct electromagnetic variable-speed gearing comprising two disk electro-magnets (or a double faced electro-magnet) fixed on a shaft with corresponding disk armatures rigidly attached to transmitting wheels of different diameters loosely mounted on said shaft. Such constructions have not proved satisfactory owing to the fact that in changing speed by deënergizing one electro-magnet and then energizing another the apparatus is subjected to a severe shock, and if the second magnet is energized before the other has been deënergized there is a tendency for the device to lock and stop. If spur gears are used as the transmitting means under these conditions there is a tendency to strip the teeth from said gears. Furthermore in such devices it is not possible by simply opening the circuit through the coils of the electro-magnets to release instantaneously the parts in magnetic engagement owing to the action of the residual magnetism in the electro-magnetic clutch members.

The object of my invention is to prevent sudden jar to the apparatus or locking of the members of the energized clutches while passing from the combination of gears controlled by one electro-magnet to that controlled by another, and at the same time to obtain a wide range of speed variation from a source of power running at substantially a constant rate of speed or a speed variable within narrow limits.

My invention consists of means for controlling a plurality of electro-magnetic clutches in a variable-speed mechanism so that a uniform acceleration through a wide range of speeds is obtained in the device to which said mechanism is applied from a source of power which is adapted to vary in speed through a comparatively small range.

My invention further consists of means for inserting a resistance in series with the actuating coils of two clutches which are simultaneously energized while changing from the combination of gears or transmitting wheels operated by one clutch to that operated by the next successive clutch in order to reduce the effective magnetic attraction of said clutches and allow a certain amount of slip between the members of the clutches thereby preventing any shock or jar to the apparatus and eliminating all tendency to lock the mechanism at the time of transition.

My invention further consists of means for varying the speed of the source of power between certain limits while the variable-speed mechanism is operating with one electro-magnet energized whereby the speed of said mechanism is varied gradually between the highest speed obtainable with one combination of gears to the lowest obtainable with the next successive combination of gears. When an electric motor is used as the source of power this speed variation is preferably obtained by varying the field strength of said motor.

Figure 3:
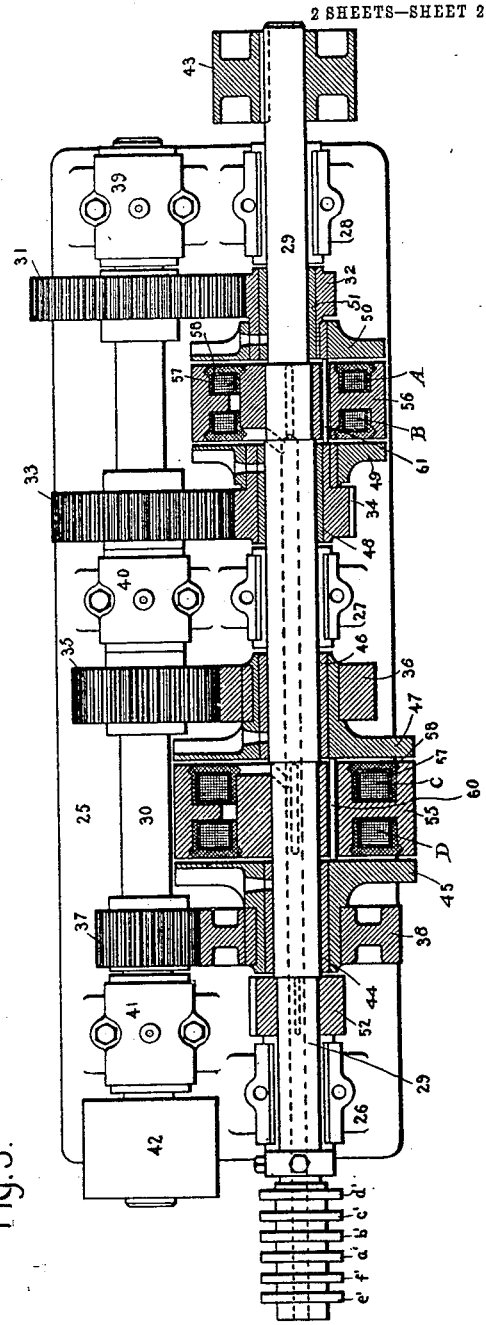

In the accompanying drawings which illustrate the preferred embodiment of my invention, Figure 1 represents diagrammatically a system of control for the electro-magnetic variable-speed mechanism; Fig. 2 is a front elevation of my variable-speed mechanism in its preferred form; Fig. 3 is a plan view partly in section of the same; Fig. 4 is a diagrammatic representation of one way in which the coils of the electro-magnetic clutches shown in Fig. 3 may be connected to the controlling devices; and Fig. 5 is an end view of the main shaft of said variable-speed device showing the manner in which the collector rings on said shaft are connected to the coils of the clutch members.

Referring now to Fig. 1, C represents a controller for controlling the operation of the clutches which are adapted to connect the motor M to its work by means of the variable-speed mechanism to be hereinafter described. The actuating coils of said clutches are represented by A, B, C and D. The several positions of the controller C are indicated by the vertical dotted lines 1 to 23 inclusive. The contact-fingers of said controller are designated by $a$, $b$, $c$, $d$, $t^2$, $e$, $f$ and 1 to 11 inclusive, while the contact segments carried by the rotatable or movable member of the controller which are in use when the coil D is thrown into operation are indicated by $d^2$, $t$, $f^2$, $1^d$ to $4^d$ inclusive, and $5'$ to $11'$ inclusive. The contact segments $t$, $5'$ and $9'$ are in use in all the remaining operative positions of the controller. When the coil C is in operation the additional contact segments used are $c^2$, $e^2$ and $1^c$ to $4^c$ inclusive. When the coil B is in operation the additional contact segments used are $b^2$, $f^3$ and $1^b$ to $4^b$ inclusive, and when the coil A is in operation the additional segments in use are $a^2$, $c^3$ and $1^n$ to $4^n$ inclusive.

The resistance 16 is adapted to be connected in circuit with the armature 13 of the motor M and is cut out of said circuit step-by-step in starting the motor. The resistance 15 is adapted to be inserted or cut out step-by-step in circuit with the motor field coil 14 thereby varying the speed of said motor between certain predetermined narrow limits during the time that each of said clutch coils is connected in circuit. The resistances 17 and 18 are adapted to be inserted in the clutch coil circuits during the transition positions of the controller in order to weaken the effective pull of the clutch magnets on their respective armatures.

In Figs. 2 and 3 I have shown the preferred form of my electromagnetic variable-speed mechanism as adapted to be applied to the running of a machine tool. Mounted upon the base plate 25 are the standards 26, 27 and 28 which support bearings in which the main shaft 29 is adapted to rotate. Keyed to the shaft 29 are the magnetic clutch members 55 and 56 which carry the actuating coils C, D and A, B respectively. The said coils A, B, C and D are held in place in annular grooves in the respective faces of said clutch members by means of the metallic bushing or packing 58, a layer of insulating material 57 being inserted in said groove between the coil and the said metallic packing. The said coils are arranged so as to form a double magnet the opposing faces of which are adapted to engage movable armature disks which are loosely mounted on the shaft 29. The armature disk 50 is mounted on the sleeve 51 and carries the gear 32. The said armature and gear are adapted to be moved longitudinally on the shaft 29 when the coil A is energized and normally rotate freely on said shaft. The armature 49 which is adapted to be moved longitudinally on the shaft 29 by means of the magnet coil B is mounted on the sleeve 48 and carries the gear wheel 34. The armature disk 47 which is adapted to be moved longitudinally on the shaft 29 by means of the magnet coil C is mounted on the rotatable sleeve 46 and carries the pinion 36. The armature 45 movable longitudinally on the shaft 29 by the magnet coil D is mounted on the sleeve 44 which is able to rotate freely on said shaft and carries the pinion 38. Passing through the magnetic clutch members 55 and 56 are the rods 60 and 61 respectively which are slightly longer than the distance between the opposite faces of said magnets. The rod 61 is adapted to prevent the armatures 50 and 49 from simultaneously contacting with the opposite faces of the magnetic clutch member 56 when the coils A and B are energized at the same time. After the coil A has been energized and the armature disk 50 attracted to the face of the magnet 56 there is a tendency for the armature disk 50 to stick to said face, due to the residual magnetization even after the coil A has been de-energized. When the coil B is energized and the armature disk 49 is moved to contact with the face of the magnet 56 the rod or rods 61 operate to force the armature disk 50 away from the opposite face of said magnet 56. Also mounted on the base plate 25 are the standards or supports 39, 40 and 41 which carry bearings or trunnions in which the countershaft 30 is adapted to rotate. Keyed or otherwise fastened to the shaft 30 are the pinions and gears 31, 33, 35 and 37 which are adapted to coact with the gear wheels and pinions 32, 34, 36 and 38 respectively. The said countershaft 30 also carries the pulley 42 which is adapted to be connected in any desirable manner with the source of power, such as the motor M, shown diagrammatically in Fig. 1. The power at the different speeds obtainable in the variable-speed mechanism may be taken from the shaft 29 through the pinion 52 or by means of the pulley 43 each of which is keyed or otherwise fastened to said shaft. Mounted on the end of the said shaft 29 and insulated therefrom are collector rings $a'$, $b'$, $c'$, $d'$, $e'$ and $f'$ which are connected to the coils A, B, C and D in such a manner as is shown in Fig. 4. One terminal of each of the coils A, B, C and D is connected respectively to the collector rings $a'$, $b'$, $c'$ and $d'$ through the connecting strips 21, 22, 23 and 24. The leads from said coil terminals pass through the hollow shaft 29 and are connected at the end of said shaft by means of binding posts or connectors to the connecting strips 21, 22, 23 and 24. The other terminals of coils A and C are connected together and are also connected to the collector ring $f'$ through the connecting strip 20. The other terminals of the coils B and D are connected together and are also connected to the collector ring $e'$ through the connecting strip 19. The brushes $a^4$, $b^4$, $c^4$, $d^4$, $e^4$ and $f^4$ are adapted to contact with the collector or contact rings $a'$, $b'$, $c'$, $d'$, $e'$ and $f'$ respectively and are connected to the proper contact-fingers in the controller C as shown in Fig. 1.

In the operation of this device the switch S in the mains $T'$ and $T^2$ which lead to the source of current supply is first closed. In the first position of the controller the coil D is connected in circuit and the motor M is started. While the controller C is moving through its first four operative positions, called the starting positions and indicated by the vertical dotted lines 1, 2, 3 and 4, the motor M is increased in speed as the resistance 16 is cut out of circuit step-by-step when the contact segments $6'$ to $11'$ inclusive engage the fingers 6 to 11 inclusive respectively. When in the fourth position of the controller C, which is really the first running position, the motor M is running at the maximum speed obtainable with full field strength, the shunt around the entire resistance 15 being maintained by the engagement of the contact-finger 4 with the contact segment $4^d$. As the controller is moved forward through the fifth, sixth, seventh and eighth positions, the resistance 15 is inserted step-by-step in the field circuit of the motor M thereby reducing the field strength of said motor and gradually increasing the speed of the motor and increasing the speed of the shaft 29 from the lowest speed obtainable by means of the combination of gears 37 and 38 when the coil D is energized to the lowest speed, or just a little below the lowest speed, obtainable by means of the combination of gears 35 and 36 when the coil C is energized and the motor is running at its lowest speed. When in the eighth position of the controller the entire resistance 15 is inserted in series with the field coil 14 of the motor M. In passing from the eighth position to the ninth position the resistances 17 and 18 are connected in series with the magnet coils C and D when the contact-fingers $c$ and $d$ are in engagement simultaneously with the contact segments $c^2$ and $d^2$, then immediately thereafter the circuit of the magnet coil D is broken, the resistances 17 and 18 cut out of circuit leaving the magnet coil C connected in circuit. As the controller is moved into the ninth position a shunt is thrown around the resistance 15 by the engagement of the contact finger 4 with the contact segment $4^c$ thereby causing a sudden reduction in the speed of the motor M to that corresponding to the fourth position of the controller. The resistances 17 and 18 are inserted in the circuits of the magnet coils C and D during transition period so as to weaken the effective magnetic pull of the said magnet coils on the armatures 45 and 47, so that a slip will take place between the said armatures and the magnet 55 such a slip being necessary since the gears 35 and 37 which coöperate with the pinions 36 and 38 are of different sizes.

While any one of the coils A, B, C and D is energized the armatures which are operated by the other of said coils are rotated freely on the shaft 29 at different speeds by means of the gear wheels and pinions carried by the power shaft 30.

The circuit through the motor and the magnet coil D when the motor controller C is thrown into its first operative position is as follows: starting from the main T′ through the switch S, blow-out coil 12, contact-finger 5, to contact segment 5′ where it divides, one branch of said circuit following the course through the contact segment 6′, contact-fingers 6 and 10, contact segments 10′ and 11′, contact-finger 11, entire resistance 16, armature 13 of the motor M to the negative main T², another branch of said circuit following the course from the contact segment 5′ to the contact segment $4^d$, contact-finger 4, field 14 of the motor M to the negative main, and a third branch of said circuit follows the path through the contact segment $f^2$, contact-finger $f$, collector ring $f'$, coil D, collector ring $d'$, contact-finger $d$, contact segments $d^2$ and $t$, contact-finger $t^2$ to the negative main T² through the switch S. The circuit through the contact-finger 4 acts as a shunt around the resistance 15 in the motor field circuit, one end of said resistance 15 being connected permanently with the field 14 and the other end of said resistance being connected with the positive main through the conductor 15′. The circuit through the contact-finger $f$ as above described in addition to its function of connecting the coil D in the energizing circuit operates as a shunt around the resistance 18 which is permanently connected between the positive main T′ and the conductor leading to the contact ring $f'$ at the point 18′.

The circuits through the motor and the magnet coil D when the controller is in its eighth position may be traced as follows: from the positive main T′ through the switch S, blow-out coil 12, contact-finger 5, contact segments 5′ and $f^2$, contact-finger $f$, collector ring $f'$, coil D, collector ring $d'$, contact-finger $d$, contact segments $d^2$ and $t$ and contact-finger $t^2$ to the negative main T², the said circuit branching at the contact-finger 5′ and following the course through the contact segment 9′, contact-finger 9, armature 13 of the motor M′ to the negative main T². The shunt field coil 14 is now connected directly across the mains through the conductor 15′ and the whole of the resistance 15.

In the transition position midway between the eighth and ninth positions of the controller C, the motor circuit may be traced as follows: from the positive main T′ through the switch S, blow-out coil 12, contact-finger 5, contact segments 5′ and 9′, contact-finger 9, armature 13 of the motor M to the negative main T². The field coil 14 is connected across the mains in series with the whole of the resistance 15 through the conductor 15′ as in the eighth position of the controller above described. Since in this transition position of the controller the contact segments $c^2$ and $d^2$ overlap so as to contact with the contact-fingers $c$ and $d$ simultaneously the circuits through the magnet coils C and D may be traced as follows: from the positive main T′ through the conductor 15′, resistances 17 and 18 in parallel, connections 17′ and 18′, collector rings $e'$ and $f'$, coils C and D, contact or collector rings $c'$ and $d'$, contact-fingers $c$ and $d$, contact segments $c^2$, $d^2$ and $t$, contact-finger $t^2$ to the negative main T². It will thus be seen that the resistances 17 and 18 are connected in series with the coils C and D, thus cutting down the amount of current which passes through said coils and diminishing the effective magnetic attraction between said coils and their respective armatures, thus allowing the desired amount of slip in passing from one coil to the next and eliminating the shock or jar to the apparatus. As the controller is moved into its ninth position and the contact segment $d^2$ leaves the contact-finger $d$, the circuit through the coil D is opened and the connection through the coil C is completed in shunt to the resistance 17 when the contact segment $c^2$ engages the contact-finger $e$. In the ninth position the shunt around the resistance 15 is again completed so that the speed of the motor is immediately reduced due to the strengthening of its field to that corresponding to position four, that is, just enough or approximately enough to compensate for the change in gear ratio in passing from the combination of gears 37 and 38 to the combination of gears 35 and 36.

In passing through the tenth, eleventh twelfth and thirteenth positions, the various shunts around the sections of the resistance 15 which are completed through the contact segments $1^c$, $2^c$, $3^c$ and $4^c$ and contact-fingers 1, 2, 3 and 4 are opened so that in the thirteenth position the entire resistance 15 is in series with the field 14 as in the eighth position of the controller, the magnet coil C remaining energized throughout these successive operative positions of the controller. In passing from the thirteenth to the fourteenth position the same transition step of inserting the resistances 17 and 18 in series with the magnet coils is repeated, this time the coils B and C being connected in circuit simultaneously in series with said resistances. In the fourteenth position the coil B is in circuit alone and the speed of the motor is again reduced to that corresponding to the fourth and ninth positions of the controller. In passing from the positions fourteen to eighteen inclusive the speed of the motor is increased step-by-step as before up to that corresponding to the eighth position of the controller, the circuit through the magnet coil B being maintained throughout these successive operative positions. The same transition step of inserting resistances 17 and 18 as above described is repeated in passing from the eighteenth to the nineteenth position of the controller, the speed of the motor being again reduced to the speed corresponding to the fourth, ninth and fourteenth positions of the controller, by shunting the resistance 15. At this time coil A is connected in circuit by the engagement of the contact segment $a^2$ with the contact-finger $a$. While passing through the remaining operative positions of the controller the circuit through the magnet coil A is maintained and the speed of the motor is gradually increased by inserting the resistance 15 in the motor-field coil circuit.

It will thus be seen that with the mechanism above described a wide range of speed variation with a power output which is substantially the same at low speeds as at high speeds is obtained by the use of a small motor the range of speed variation of which is comparatively limited.

The device just described constitutes the preferred embodiment of my invention but I do not care to be limited to the specific details of construction herein shown and described as many changes and modifications may be made by persons skilled in the art without departing from the spirit and scope of my invention.

What I claim as new and desire to secure by Letters Patent of the United States, is—

1. In combination, a plurality of electromagnetic clutches in a variable-speed mechanism, a source of power variable in speed between narrow limits, and means for controlling the variation of the speed of said source of power and for controlling the successive operation of said clutches whereby a wide range of speed variation with a uniform acceleration is obtainable from said source of power.

2. In combination, a variable-speed mechanism comprising a plurality of electromagnetic clutches and transmitting wheels having different speed ratios adapted to be thrown into operation successively by said clutches, a source of power having a narrow range of speed variation operatively connected with said clutches, and means for controlling the said variable-speed mechanism and said source of power so that a uniform acceleration through a wide range of speeds is obtained.

3. In combination, a variable-speed mechanism comprising a plurality of electromagnetic clutches and transmitting wheels having different speed ratios connected in operative relationship successively by said clutches, a motor for driving said variable-speed mechanism, and means for controlling the successive operation of said clutches and for varying the speed of said motor between certain predetermined narrow limits during the operation of each successive clutch whereby a uniform acceleration of said variable-speed mechanism through a wide range of speeds is obtained.

4. In combination, a variable-speed mechanism comprising a plurality of electromagnetic clutches and transmitting wheels having different speed ratios connected in operative relationship successively by said clutches, a source of power for driving said mechanism, and means for energizing two successive clutches simultaneously and at the same time reducing the effective attractive power of said clutches whereby a certain amount of slip is allowed while passing from the transmitting wheels having a certain speed ratio to those having next higher or lower speed ratio.

5. In combination, a variable-speed mechanism comprising a plurality of electromagnetic clutches and transmitting wheels having different speed ratios connected in operative relationship successively by said clutches, a source of power connected with said mechanism, a resistance, and a controller for connecting two successive clutches in circuit simultaneously and for inserting said resistance in circuit with said clutches while passing from the operative positions of said controller corresponding to one clutch to those corresponding to the next successive clutch.

6. In combination, a variable-speed mechanism comprising a plurality of electromagnetic clutches and transmitting wheels having different speed ratios connected in operative relationship successively by said clutches, a motor adapted to vary in speed between certain predetermined narrow limits, a resistance, and a controller so constructed and arranged as to connect said clutches successively in circuit and while each of said clutches is in circuit to vary the speed of said motor between said predetermined limits and while passing through the transition points between the operative positions corresponding to one clutch to those corresponding to the next successive clutch to connect said clutches simultaneously in circuit with said resistance thereby reducing the effective magnetic attraction of said clutches to allow a certain amount of slip.

7. In combination, a motor, an electrically operated variable speed mechanism driven by said motor, and a controller for alternately increasing the speed of the motor through a definite range and changing the speed mechanism to its next faster position and vice versa.

8. In combination, a variable speed mechanism, a motor for driving said mechanism, electrically operated means for changing the variable speed mechanism from one speed position to another, and means for varying the speed of the motor through a definite range during each speed position of the speed mechanism.

9. In combination, a variable speed mechanism, a motor for driving said mechanism, means for operating said mechanism at one of its speeds, means for varying the speed of the motor, and means for shifting to another speed of said mechanism and simultaneously returning the speed of said motor to its original value.

10. In combination, a variable speed mechanism, comprising a series of clutches and transmission wheels having different speed ratios, a motor for driving said mechanism, means for energizing one of said clutches, means for increasing the speed of said motor, and means for energizing a second clutch having a higer speed ratio and simultaneously deënergizing the first clutch and decreasing the speed of said motor.

11. In combination, a variable speed mechanism, comprising a series of electro-magnetic clutches and transmission wheels having different speed ratios, a motor for driving said mechanism, and a controlling switch for said motor and said clutches adapted to energize one of said clutches, then to insert resistance in the field of said motor, then to insert resistance in the circuit of said clutch and to energize through a resistance a second clutch having a higher speed ratio, and then to deënergize the first clutch and to cut out the resistances from the field of motor and from the circuit of the second clutch.

12. The combination with a driving mechanism variable in speed between narrow limits, of a plurality of magnetic clutches in a variable speed mechanism, and means for gradually accelerating the driven members of said clutches as they are successively operated.

13. The combination with a driving mechanism, having a variable speed within narrow limits, of a plurality of magnetic clutches, a plurality of transmitting wheels having different speed ratios and thrown into operation by said clutches, and means for gradually accelerating the speed of the driven members of said clutches.

14. The combination with a motor, of means for varying the speed thereof, a plurality of magnetic clutches in a variable speed mechanism, and means for gradually accelerating the driven members of said clutches.

15. The combination with a motor, of a plurality of speed-changing gears for connecting the same with the machinery to be driven, and means for inserting a resistance in the shunt field of the motor to increase the speed thereof after each change of speed by said gears.

16. The combination with a motor, of a plurality of speed-changing gears, and a plurality of magnetic clutches for connecting the same with the motor, and means for increasing the speed of the motor above normal after each change of speed of said gears.

17. The combination with a motor, of a plurality of magnetic clutches, a rheostat having a movable element, means for controlling said motor and said clutches in the desired way by the operation of said movable element.

18. The combination with a motor, of a plurality of double magnetic clutches, a rheostat having a movable element, said element in one position serving to cause the operation of said motor and in another position to cause the operation of the several clutches.

19. The combination with a motor, of a plurality of magnetic clutches, a rheostat and a movable element therefor adapted to change the speed of said motor after the operation of each of said clutches.

20. The combination with a motor, of a plurality of magnetic clutches, a rheostat and a movable element therefor, adapted to control said motor and said clutches, said movable element being adapted to change the speed of the motor during the time each of said clutches is operated.

In witness whereof, I have hereunto set my hand this seventeenth day of December, 1902.

ALEXANDER CHURCHWARD.

Witnesses:
THOS. K. HENDERSON,
LEO C. FOSS.